US007281173B2

(12) United States Patent
Hite et al.

(10) Patent No.: US 7,281,173 B2
(45) Date of Patent: Oct. 9, 2007

(54) METHOD AND SYSTEM FOR CONCURRENT ERROR IDENTIFICATION IN RESOURCE SCHEDULING

(75) Inventors: Cheryl Hite, Redwood Shores, CA (US); Tyler Morse, Brisbane, CA (US); Ofer Matan, Palo alto, CA (US); Tiffany Boehmer, Palo Alto, CA (US); Illah Nourbakhsh, Pittsburgh, PA (US); Serdar Uckun, Palo Alto, CA (US); Jason Fama, Mountain View, CA (US); Edward Reusser, Sunnyvale, CA (US); Gregory Fichtenholtz, Sunnyvale, CA (US); Simon Shvarts, Cupertino, CA (US)

(73) Assignee: Witness Systems, Inc., Roswell, GA (US)

( * ) Notice: Subject to any disclaimer, the term of this patent is extended or adjusted under 35 U.S.C. 154(b) by 86 days.

(21) Appl. No.: 11/237,456

(22) Filed: Nov. 15, 2005

(65) Prior Publication Data

US 2006/0053340 A1   Mar. 9, 2006

Related U.S. Application Data

(63) Continuation of application No. 09/837,251, filed on Apr. 18, 2001, now Pat. No. 6,959,405.

(51) Int. Cl.
  *G06F 11/00* (2006.01)
  *G06F 9/46* (2006.01)
  *G06F 19/00* (2006.01)
(52) U.S. Cl. ................... 714/57; 705/8; 705/9; 700/99; 700/100
(58) Field of Classification Search ................... 714/57; 705/8, 9; 700/99, 100
  See application file for complete search history.

(56) References Cited

U.S. PATENT DOCUMENTS 3,594,919 A   7/1971   De Bell et al.

(Continued)

FOREIGN PATENT DOCUMENTS

EP   0453128 A2   10/1991

(Continued)

OTHER PUBLICATIONS

"Customer Spotlight: Navistar International," Web page, unverified print date of Apr. 1, 2002.

(Continued)

*Primary Examiner*—Christopher McCarthy
(74) *Attorney, Agent, or Firm*—Thomas, Kayden, Horstemeyer & Risley, LLP

(57) ABSTRACT

A method and system for handling real-time indications of resource scheduling conflicts. In one embodiment, the method includes a computer system including a user interface, display, processor, and some form of memory. Contained within the memory is a resource scheduling process that analyzes resource data, scheduling criteria, and work parameters to create a working schedule. In conjunction with the creation of a working schedule, the scheduling process detects resource conflicts that can inhibit the schedule's functionality. Once detected an identification process conveys the error to the user concurrently with the schedule process to provide the user with a real-time indication of resource conflicts. The indication is presented in an unobtrusive manner so as to not interfere or impede the scheduling process. In addition, should the specific resource causing the conflict be identifiable, the indication process conveys that information in a similar real-time methodology.

1 Claim, 9 Drawing Sheets

U.S. PATENT DOCUMENTS

| | | | |
|---|---|---|---|
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,937,743 A * | 6/1990 | Rassman et al. | 705/8 |
| 4,953,159 A | 8/1990 | Hayden et al. | |
| 5,016,272 A | 5/1991 | Stubbs et al. | |
| 5,101,402 A | 3/1992 | Chiu et al. | |
| 5,111,391 A | 5/1992 | Fields et al. | |
| 5,117,225 A | 5/1992 | Wang | |
| 5,185,780 A | 2/1993 | Leggett | 379/34 |
| 5,195,172 A | 3/1993 | Elad et al. | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,289,368 A | 2/1994 | Jordan et al. | 364/401 |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,325,292 A | 6/1994 | Crockett | 364/401 |
| 5,347,306 A | 9/1994 | Nitta | |
| 5,369,570 A | 11/1994 | Parad | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,477,447 A | 12/1995 | Luciw et al. | 364/419.08 |
| 5,481,667 A | 1/1996 | Bieniek et al. | 395/161 |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,659,768 A | 8/1997 | Forbes et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,917,485 A | 6/1999 | Spellman et al. | 345/336 |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,021,403 A | 2/2000 | Horvitz et al. | 706/45 |
| 6,021,428 A | 2/2000 | Miloslavsky | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,044,355 A | 3/2000 | Crockett et al. | |
| 6,049,776 A * | 4/2000 | Donnelly et al. | 705/8 |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,081,592 A | 6/2000 | Battle | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,167,379 A * | 12/2000 | Dean et al. | 705/9 |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIllwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,381,580 B1 * | 4/2002 | Levinson | 705/8 |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIllwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,647,448 B1 * | 11/2003 | Brelin | 710/107 |
| 6,665,644 B1 | 12/2003 | Kanevsky et al. | |
| 6,674,447 B1 | 1/2004 | Chiang et al. | |

| | | | |
|---|---|---|---|
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,732,080 B1* | 5/2004 | Blants | 705/9 |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIllwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065700 A1* | 5/2002 | Powell et al. | 705/9 |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |
| 2004/0100507 A1 | 5/2004 | Hayner et al. | |
| 2004/0165717 A1 | 8/2004 | McIlwaine et al. | |
| 2005/0091098 A1* | 4/2005 | Brodersen et al. | 705/8 |
| 2005/0197877 A1* | 9/2005 | Kalinoski | 705/8 |
| 2006/0015386 A1* | 1/2006 | Moore | 705/8 |
| 2006/0026052 A1* | 2/2006 | Klett et al. | 705/8 |

FOREIGN PATENT DOCUMENTS

| | | |
|---|---|---|
| EP | 0773687 A2 | 5/1997 |
| EP | 0 817 455 A2 | 1/1998 |
| EP | 0 863 650 A2 | 9/1998 |
| EP | 1 039 732 A2 | 9/2000 |
| EP | 1 162 814 A2 | 12/2001 |
| GB | 2 339 643 A | 2/2000 |
| GB | 2369263 | 5/2002 |
| WO | WO 98/43380 | 11/1998 |
| WO | WO 00/08556 | 2/2000 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 152, Web page, unkown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—The SunTAN Story," Internet Time Group 8 (©2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communicatons ACM* 45(5):60-61 (May 2002).

Dennis and Gruner, "Computer Managed Instruction at Arthur Andersen & Company: A Status Report,"*Educational Technical* pp. 7-16 (Mar. 1992).

Diessel et al., "Individualized Course Generation: A Marriage Between CAL and ICAL,"*Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies,"*Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training*, pp. 23-25 (Jul. 1997).

Eline, "Case Study: IBT's Place in the Sun" *Technical Training*, pp. 12-17 (Aug./Sep. 1997).

Fritz, "CB templates for productivity: Authoring system templates for trainers,"*Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance:Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology amd Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support,"*Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring,"*Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,"* *Communications ACM* 38(7):27-39 (Jul. 1995).
O'Herron, "CenterForce Technologies CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations, authored by Alan Lesgold, unverified cover date of Mar. 5, 1998.
Papa et al., "A Differential Diagnostic Skills Assessment and Tutorial Tool,"*Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD,"*Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld*20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQualityto Business".
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommunications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC World Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around-?*,DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
EchoStar, *MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle, *Will The Net Kill Network TV?*PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.

Linderholm, *Avatar Debuts Home Theater PC*, PC World Online, Dec. 1, 1999.
Mendoza, *Order Pizza WhileYou Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

\* cited by examiner

Network Diagram

METHOD AND SYSTEM FOR CONCURRENT ERROR IDENTIFICATION IN RESOURCE SCHEDULING

RELATED APPLICATIONS

This application is a continuation of U.S. patent application Ser. No. 09/837,251, filed Apr. 18, 2001 now U.S. Pat. No. 6,959,405.

FIELD OF THE INVENTION

The invention is in the field of real-time error handling. More particularly this invention relates to the real-time handling of resource scheduling conflicts and resolution of those conflicts in a complex scheduling environment.

BACKGROUND OF THE INVENTION

Resource scheduling is a complex task that requires satisfaction of several potentially conflicting goals and constraints. In a complex environment a resource scheduling algorithm may reach its conclusion with several unfulfilled goals and exceptions. These unfulfilled goals frustrate the intended result of a working resource schedule. One such complex environment of resource scheduling is call center forecasting and agent scheduling. In this complex and diverse setting, a significant amount of configuration and parameter specifications must be done via user interfaces before a final result can be produced. Existing applications for resource scheduling do not adequately produce an unobtrusive interactive mechanism for warning the user of parameter or configuration selections that are likely to result in poor performance or failure of the schedule.

Current algorithms produce warnings or an indication of a conflict that interrupt the scheduling process. Present scheduling systems, known to one skilled in the art, use modal interfaces to detect and inform the user of errors. Errors that are detected in mid-stream of the user' work forcibly interrupt the user with a warning message. This warning message prevents the user from continuing work without at least acknowledging its presence. These warning mechanisms are rigid in their application and, if disabled, are completely ineffective at providing any type of failure notification. For example, this warning process is accomplished through a series of programmed communications between the error detection program and the primary scheduling program that results in the scheduling operations ceasing.

The prior art fails to provide an unobtrusive or concurrent means to notify a user of a resource scheduling conflict. By forcing the user to interact with a warning or notification of a pending error, the efficiency of the scheduling process suffers. If the user elects to dismiss the warning, no further indication is present to convey to the user that the conflict is still present. Furthermore, should a user elect to correct the conflict upon receiving notification, the user is required to navigate independently in the program to the position in the program that contains the cause of the conflict, which is both inefficient and costly.

SUMMARY OF THE DISCLOSURE

A method and system for handling real-time identification and notification of resource scheduling conflicts is described. In one embodiment, the claimed method works concurrently with a resource scheduling process to indicate to the user in an unobtrusive manner that a resource conflict has occurred. The user, upon selecting the indication of an error, is provided with a description of the conflict and the option of suppressing or resolving the resource conflict. In another embodiment the indication is represented by a visual depiction of a stoplight located at the lower right corner of the display. The colors red and yellow are used to depict unsuppressed and suppressed conflicts respectively. One skilled in the art will recognize that the identification and notification of the conflict may be through any number of media including but not limited to visual, aural, or tactile means.

If the user elects to resolve the resource conflict, one embodiment provides a hyperlink utilizing ordinary Hypertext Markup Language ("HTML") to link the user to the corresponding portion of the scheduling process where the conflict exists. Furthermore, should the user elect to use the hyperlink to access the appropriate page, the entry that is creating the conflict is highlighted for ease of identification. Once the conflict has been resolved, the real-time indication, in this embodiment the stoplight, will revert to a green light indicating that no resource conflicts exists. Conversely if the user elects to suppress the conflict the red light will change to yellow and remain illuminated until the suppressed conflict is resolved. Should a new conflict arise, both the red light and the yellow light will illuminate indicating that suppressed as well as unsuppressed resource conflicts exist. Throughout these indications of conflicts the functionality of the scheduling process remains unaffected and the user is unimpeded should he or she decide to ignore the conflict indication.

DETAILED DESCRIPTION

A system and method for real-time handling of error identification and notification in complex environments, such as call centers, are described. In the description that follows, numerous specific details are set forth in order to provide a thorough understanding of the present invention. It will be evident, however, to one skilled in the art that the method and system presented may be practiced without these specific details.

Figure 1:
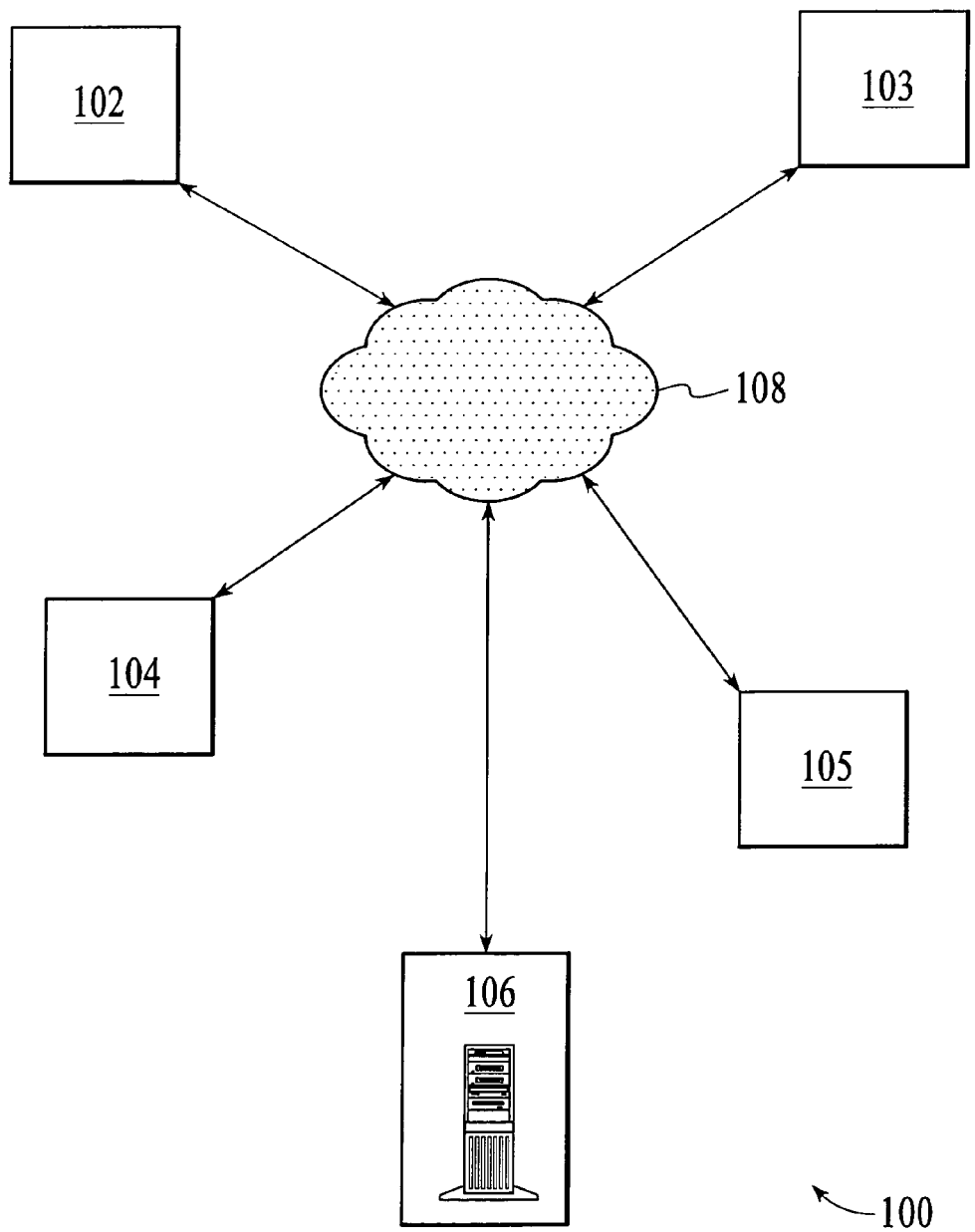
FIG. 1 is a block diagram of an embodiment of a network system for real-time resource scheduling error identification.

FIG. 1 is an embodiment of a system, 100, for providing a real-time identification and notification of resource scheduling conflicts. The system includes multiple client computers, 102-105, which are coupled to the server, 106, through a network, 108. The network, 108, can be any network, such as a local area network, a wide area network, or the Internet. The client computers each include one or more processors and one or more storage devices. Each of the client computers also includes a display device, and one or more input devices. All of the storage devices store various data and software programs. In one embodiment, the method for providing a real-time indication of resource conflicts in a resource scheduling process is carried out on the system, 100, by software instructions executing on one or more of the client computers, 102-105. The software instructions may be stored on the server, 106, or on any one of the client computers. For example, one embodiment presents a hosted application used by a call center of an enterprise that requires complex scheduling of many employees. The software instructions are stored on the server and accessed through the network by a client computer operator of the enterprise. In other embodiments, the software instructions may be stored and executed on the client computer. A user of the client computer with the help of a user interface can enter data required for the execution of the software instructions. Data required for the execution of the software instructions can also be accessed via the network and can be stored anywhere on the network.

One embodiment of a method for providing a real-time identification of resource conflicts during a scheduling process can be used in the call center environment. A call center is an organization that answers and responds to telephone calls from customers for one or more particular organizations. Call centers also respond to other customer contacts, such as e-mail, faxes, voice over Internet protocol, and web chat. Such centers possess a plurality of resources. A resource can be the equipment, the employees, the facilities, or any other asset that facilitates the business in achieving its purpose. In a call center the individual employees answering the calls are agents and each possesses a particular skill set. Each employee is therefore an example of a resource with specialized skills. For example one agent may be able to respond to technical problems, another may specialize in billing questions and still another may specialize in taking product orders. Each agent likely possesses multiple skill sets and a call center manager's challenge is to optimize the agents' schedules so as to maximize the utilization of these skill sets without compromising the functionality of the center, thus minimizing cost.

As the call center schedule is developed, minor modifications in an employee's availability schedule or the call center's resource requirements can require the entire schedule to be regenerated. Numerous working parameters and employee criteria are established to ensure the profitability and efficiency of day to day operations. Considerations such as the maximum number of hours worked per pay period per employee, the maximum period of work without a break, or the necessity for at least two experienced call agents to be on call at any one time are examples of such criteria and parameters. In one embodiment of the present method, as a scheduler inputs changes into a working schedule, a real-time indication is presented to the user if the alteration in the schedule affects a parameter or criteria adversely and will impair the overall functionality of the schedule.

Real-time indications are a result of the scheduling program constantly recalculating the viability of the proposed data into a working schedule. As new data is input the entire schedule is reconfigured and checked for conflicts without any interface or input by the user other than the original entry of the data. The feedback to the user of any conflicts is immediate. For example, an alteration of an agent's ability to maintain a work shift may have dramatic overall affects. Since the agent possesses a certain skill set and the call center must be maintained with a minimum level of skilled individuals, the deletion of the agent's skills from the working schedule may result in the center being understaffed for a particular period. In such a situation the real-time error identification system would present, in one embodiment, a red light depicted as, but not limited to, a stoplight at the bottom of the display to notify the user of the conflict.

The indication would occur as soon as the user altered the employee's schedule. Since the indication of the error is unobtrusive, meaning that the display of the conflict or scheduling problem would not interfere with the normal operation of the scheduling program, the user can continue to alter the schedule as he or she feels fit. Thus, if in this example the user was aware that the alteration of the agent's work schedule would present a problem but has already envisioned a resolution of the conflict, the user need not waste time by having to interact with warning system needlessly. Upon seeing the indication of a conflict, the user could input the potential solution and see if the red light is removed indicating the conflict has been resolved thus validating the envisioned solution.

Likewise, in another embodiment, a user can first become aware of a conflict through the real-time identification system. In this situation if a user alters the schedule, the concurrent identification will unobtrusively notify him or her that a problem exists. The system described in this embodiment does not require the entire form or schedule to be completed before an error is detected. The user in this embodiment can select the identification symbol, the red light in this case, and be presented with a new window containing a description of the conflict as well as a proposed solution. The user can then elect to suppress or ignore the conflict resulting in the illumination of a yellow light in the stoplight depiction or select a hyperlink located within the description that will open the primary scheduling process window centered on the functional area containing the conflict. The window containing the conflict will further have the entry causing the problem highlighted for easy recognition. With the conflict resolved, the new window can be closed and the original scheduling process continued without the presence of an error indication.

If the user elects to suppress the conflict, the yellow light indication will remain illuminated until the conflict is resolved. The suppression of the conflict does not impede the real-time identification of other conflicts. If an additional conflict is identified, a new red light indication is displayed in conjunction with the yellow light indicating a new conflict as well the multiple warnings or conflicts that are suppressed. Selection of the conflict identification will, in this embodiment, present not only descriptions and potential solutions of the current conflict but of the suppressed conflicts as well. Further, if multiple conflicts exist that are not suppressed, selecting the red light will list all of the conflicts for the user's review. The resolution of the resource conflict removes the scheduling error and cancels any indication present. This can be accomplished by following advice given in the resolution window or by disregarding the potential solution and inputting a different change that will alleviate the conflict.

An additional embodiment provides the user with a means to associate a conflict with a particular resource and provides a real-time indication of that association to the user. As with the previous embodiments, the identification and handling of resource conflicts occurs concurrently with the primary scheduling process. Once a conflict occurs, an indication of the conflict is presented to the user in such a manner as to not interfere with his or her use of the application. In addition to the real-time communication of a problem, this embodiment provides a method wherein the specific resource associated with or causing the conflict is readily identified to the user.

In one embodiment, a visual indication or symbol is placed next to the resource that is associated with a conflict. Furthermore, this method of identification can differentiate the type of conflicts associated with each resource. If, for example, the conflict is rule based such as exceeding the maximum number of hours worked per week, this embodiment conveys this information to user without interrupting the scheduling process by placing a symbol next to the resource. Likewise if a conflict is due to a scheduled meeting or similar calendar event, the method can similarly communicate such information to the user without disrupting the normal operation of the scheduling process. In one embodiment the method places a visual indication such as an exclamation mark or any other form of visual symbol next to the conflicted resource and alters the color of the exclamation mark based on the type of conflict. Likewise the indication could be aural or any other similar medium to communicate the identification of a conflict to the user. If, in this embodiment, the exclamation mark is blue the conflict associated with that employee rises from a rule problem whereas if the exclamation mark is red the problem is based in a conflict with a meeting or other calendar events. These and other depictions are described in the following diagrams.

Figure 2:
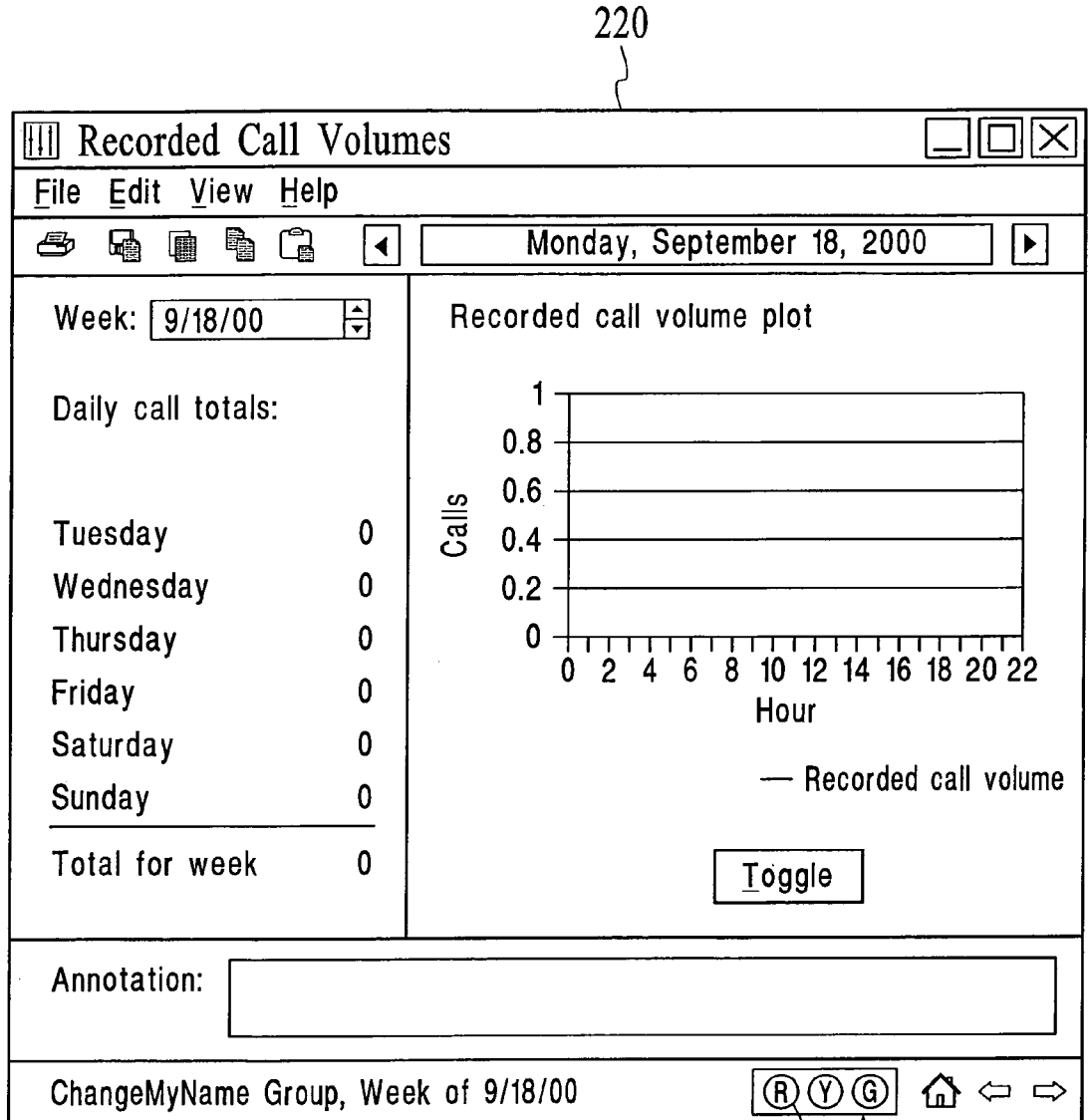
FIG. 2 is a depiction of an embodiment for real-time resource scheduling error identification showing a conflict situation.
Figure 3:
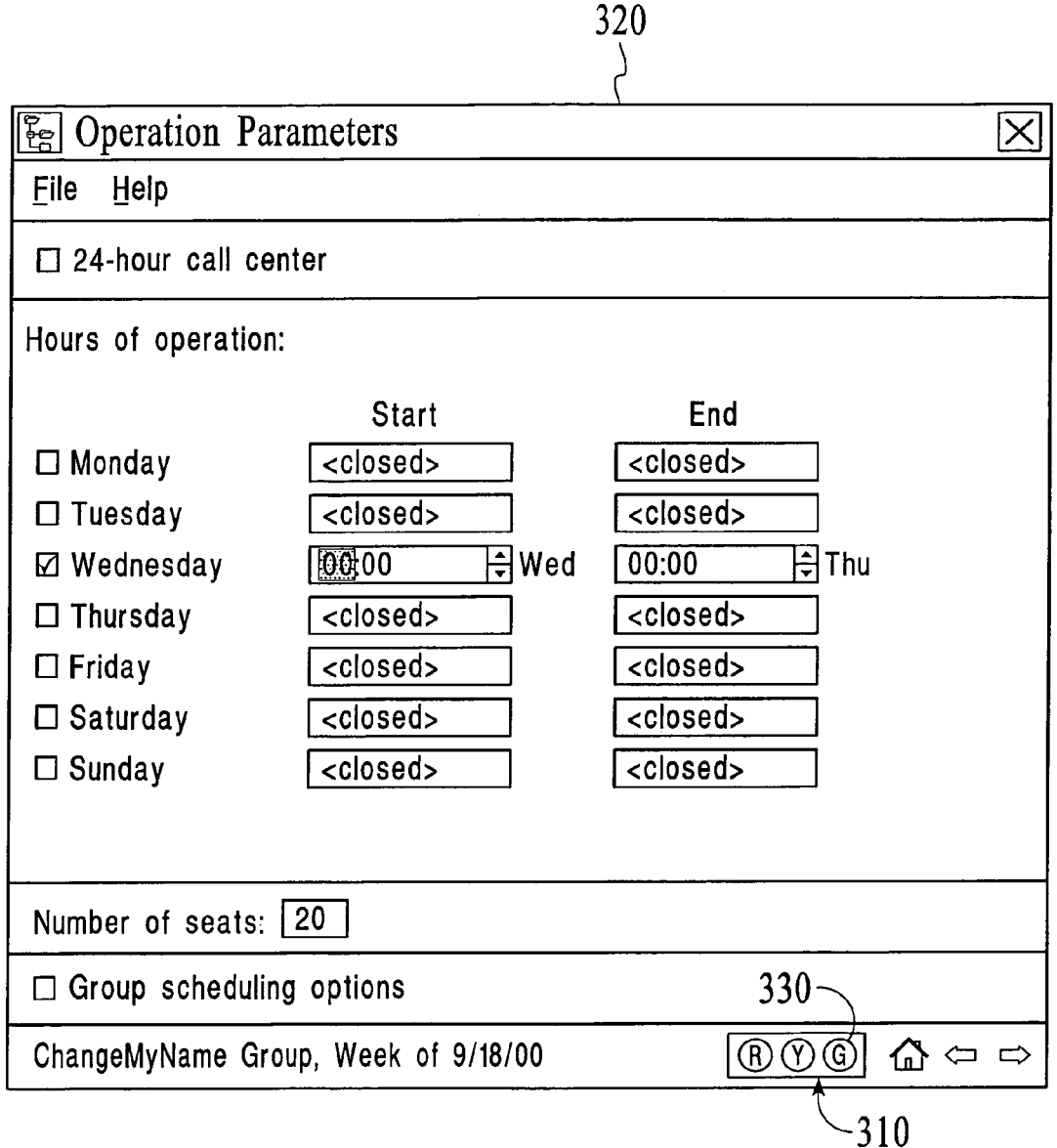
FIG. 3 is a depiction of an embodiment for real-time resource scheduling error identification showing a situation with no resource conflicts.

FIG. 2 is a depiction of a Recorded Call Volumes page, 220, of an embodiment for real-time identification and notification of resource conflicts. In this embodiment the depiction of a stoplight, 210, presents an indication of a resource conflict to the user. Here, the stoplight can be found in the lower rightmost corner of the window with the left, 230, red light illuminated indicating that a conflict exists. The stoplight, or any other suitable depiction to convey the existence of a resource conflict, can be located at a plurality of locations on the window. The stoplight in this embodiment is configured as a single row of lights in a horizontal orientation near the navigation and home icons located in lower right hand corner of the window. The stoplight depicts a conventional configuration of a traffic signal with a red light being the furthermost left light, the green light being furthermost to the right, and a yellow light in the center. FIG. 3 is depiction of an Operations Parameters page, 320, of an embodiment for identification and notification of resource conflicts where no conflicts exist. This window possesses a similar stoplight, 310, as described above which is also located in the lower right corner. In this embodiment the stoplight has the far right, 330, green light illuminated indicating to the user that no resource conflicts are present. In either of these embodiments using a stoplight pictogram for indicating a resource conflict, the center light, if illuminated, would be yellow and would indicate that a conflict or multiple conflicts have been suppressed by the user.

Figure 4:
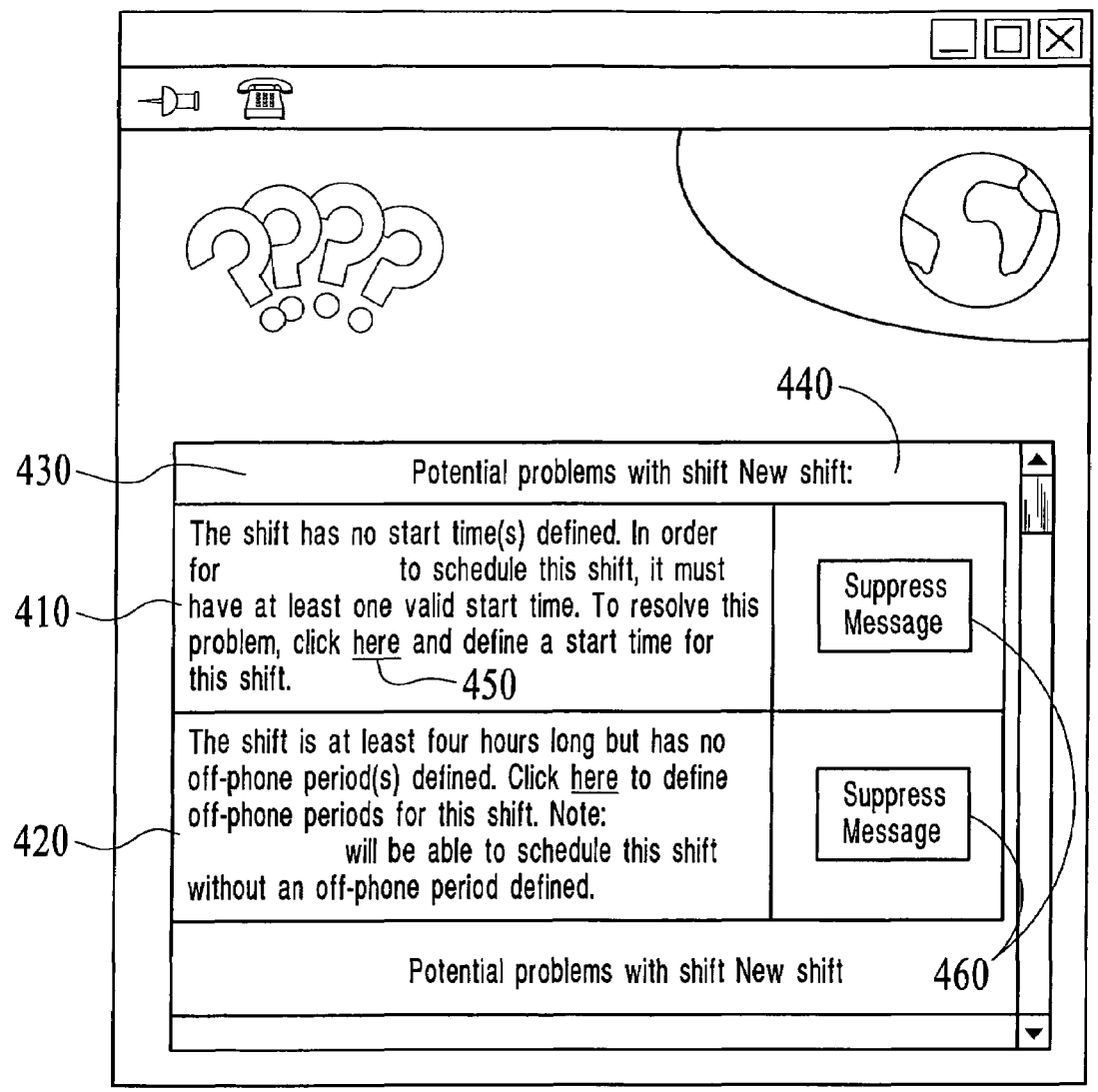
FIG. 4 is a depiction of an embodiment for real-time resource scheduling error identification showing a conflict description and resolution window.

FIG. 4 depicts the resolution window of one embodiment of a method for real-time identification of resource scheduling conflicts. This window appears after an indication of a conflict has been presented to the user, such as a red light illustrated above, and the user has clicked on the light to view the potential solution in an effort to resolve the conflict. The window in FIG. 4 indicates that there are multiple conflicts to be resolved, 410 and 420. The error identification program identifies and informs the user of the location of the potential problem on the top line, 430. In this embodiment the conflict has been found in a shift named "New Shift," 440. The method has determined that New Shift does not have a start time and is in violation of a program rule. The window offers a solution to the conflict by stating that New Shift must have at least one valid start time. Furthermore, this embodiment presents a hyperlink, 450, to the location in the scheduling program where correct start times should be input. If the user selects the hyperlink "here," 450, the program will open a window where the user can define a start time thus resolving the conflict. The new window will highlight the area that must be altered to resolve the conflict. Also depicted in FIG. 4 are two suppress buttons, 460, associated with the two displayed conflicts. These buttons allow the user to suppress the current conflicts and illuminate the yellow light in the stoplight pictogram.

Figure 5:
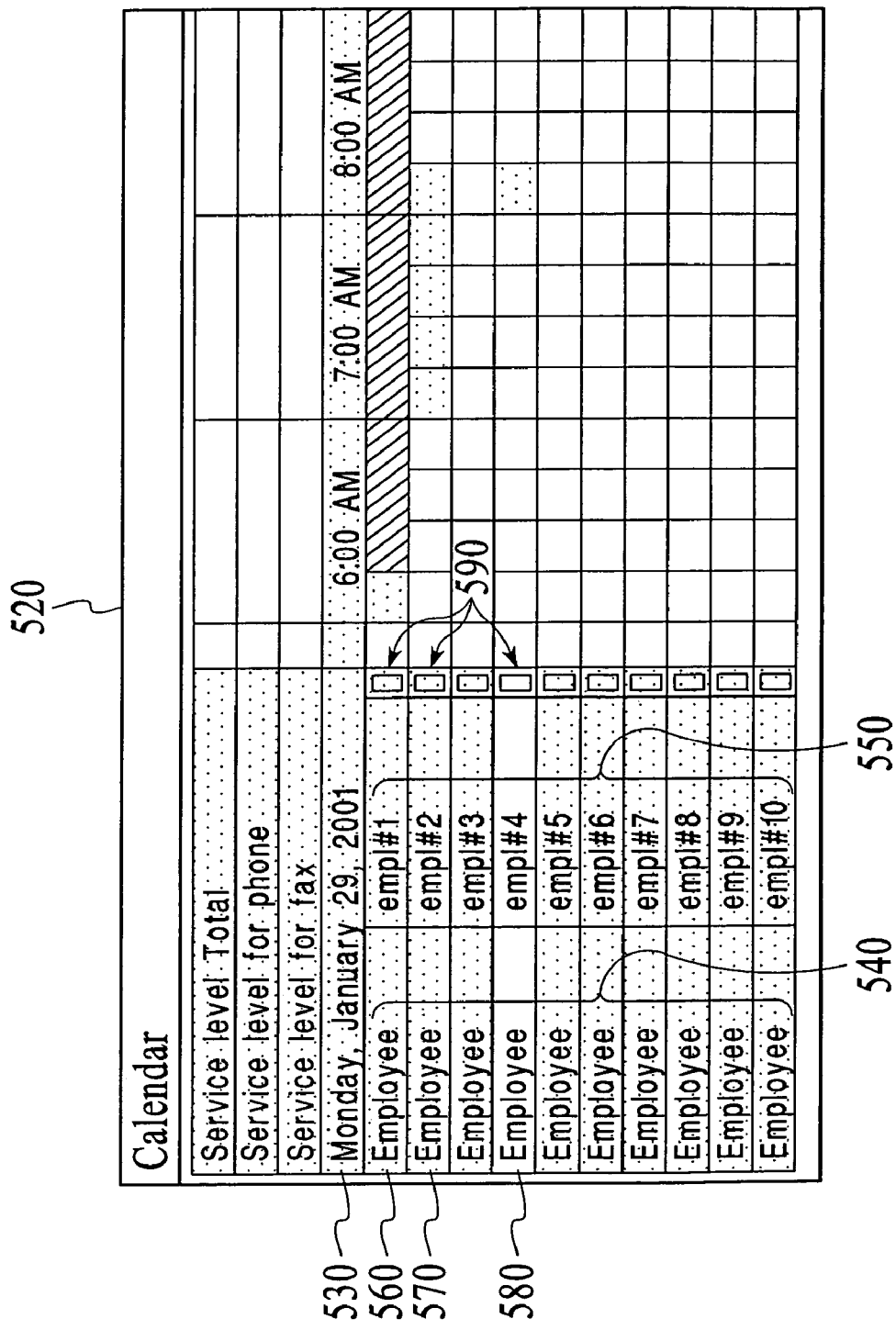
FIG. 5 is a depiction of an embodiment for real-time resource scheduling error identification associated with specific resources.

FIG. 5 is a Calendar page, 520 using one embodiment of a method for identification and notification of resource conflicts where conflicts are associated with specific resources. The depiction shows a schedule calendar for the date Monday, Jan. 29, 2001. Under the date, 530, is a plurality of columns including one categorizing the resource being scheduled as "employee". In the embodiment illustrated in FIG. 5 there are ten resources 540. all of the category "employee". To the right of the category listing is another column that individually identifies each resource. This column contains employee identification numbers 550, which include empl#1 through empl#10, 550. In this embodiment, for the resources identified as empl#1, 560, empl#2, 570, and empl#4, 580, an exclamation mark 590 is located in the column immediately adjacent to the employee identification number. This exclamation mark 590 indicates that there is a resource conflict associated with each of these employees 560, 570 and 580.

Figure 6:
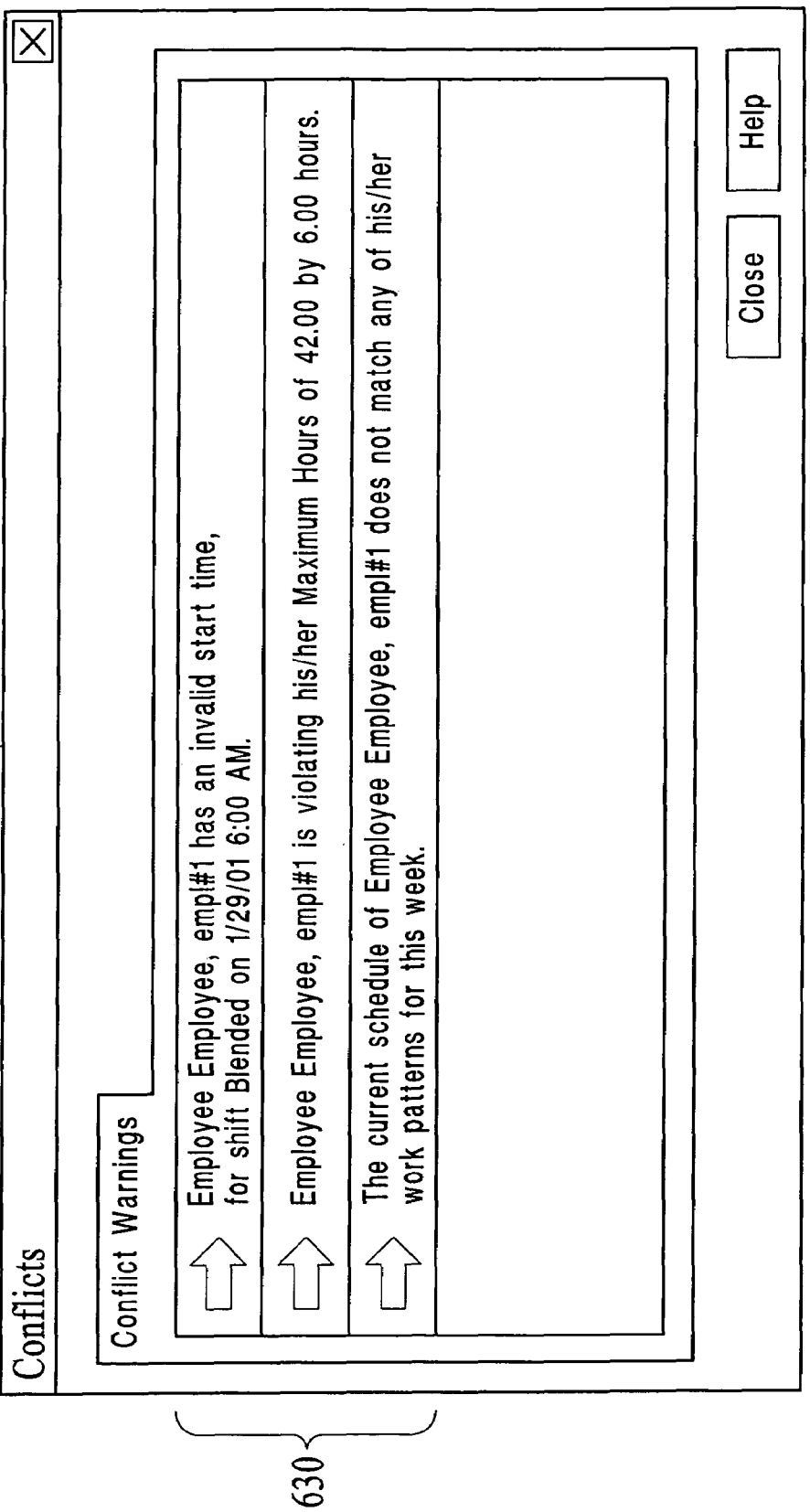
FIG. 6 is a depiction of an embodiment for real-time resource scheduling error identification illustrating a typical list of rule based conflicts associated with a specific resource.

An additional embodiment further allows the user to review all the conflicts associated with a particular resource and individually select which conflicts are to be resolved. FIG. 6 is a Conflicts page, 620, of an embodiment of the method for identification and notification of resource conflicts in which an employee has been associated with a conflict and the user has chosen to review the conflicts. After the user clicks on the associated symbol, a list of conflicts associated with that resource is displayed, 630. In FIG. 6 empl#1 has three rule based conflicts 630.

Figure 7:
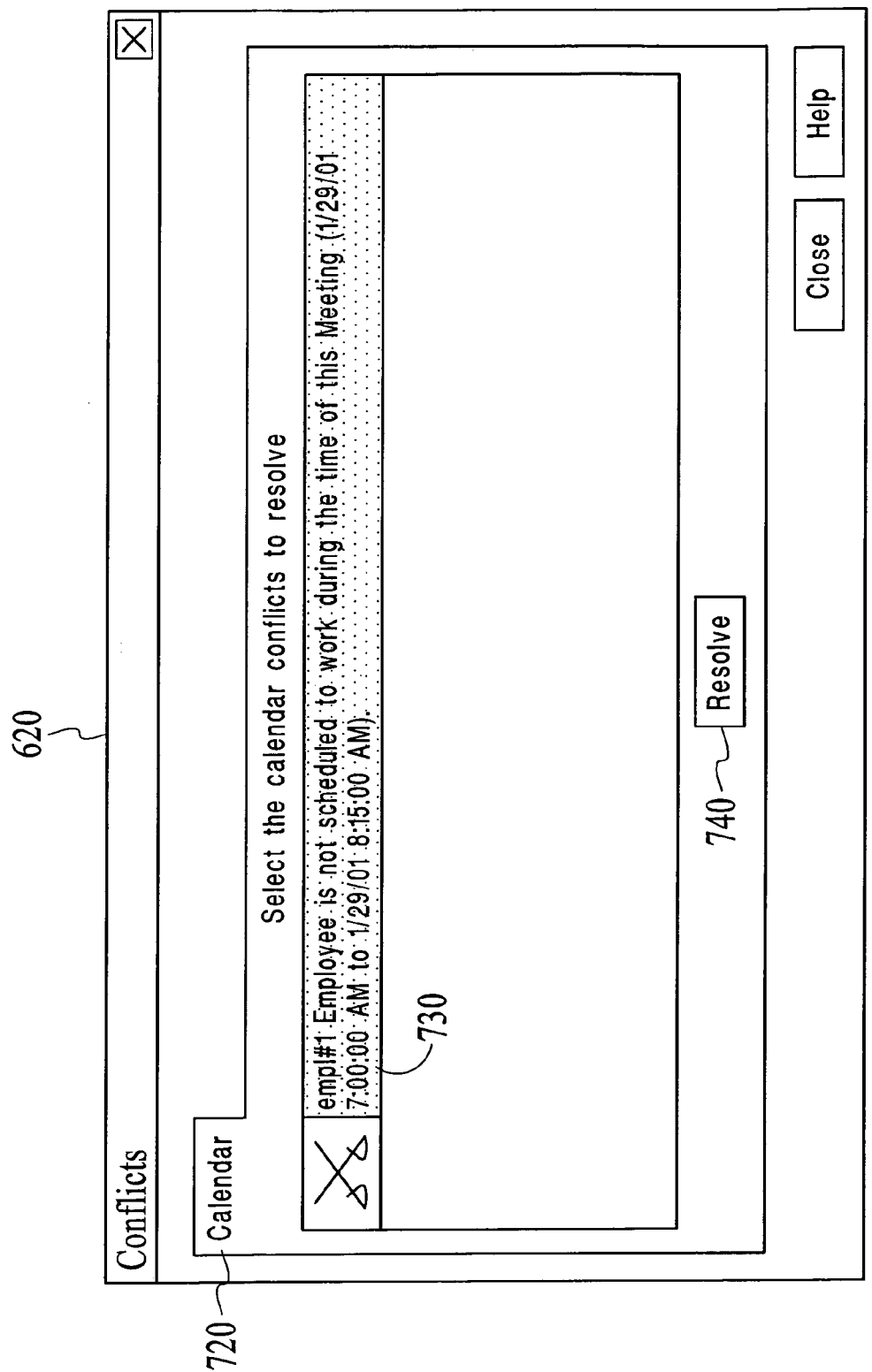
FIG. 7 is a depiction of an embodiment for real-time resource scheduling error identification showing a calendar based conflict associated with a specific resource.

FIG. 7 presents another embodiment including a Calendar page 720. Shown on the Calendar page 720 is a calendar conflict, 730, associated with empl#2. As depicted in FIG. 7, the calendar conflict is resolvable by selecting the button on the bottom of the page, 740. By selecting the resolution button 740, one embodiment opens a new window on top of the conflict window to offer possible solutions and also to present links to the area of the program where alterations to the resource's utilization can be made.

Figure 8:
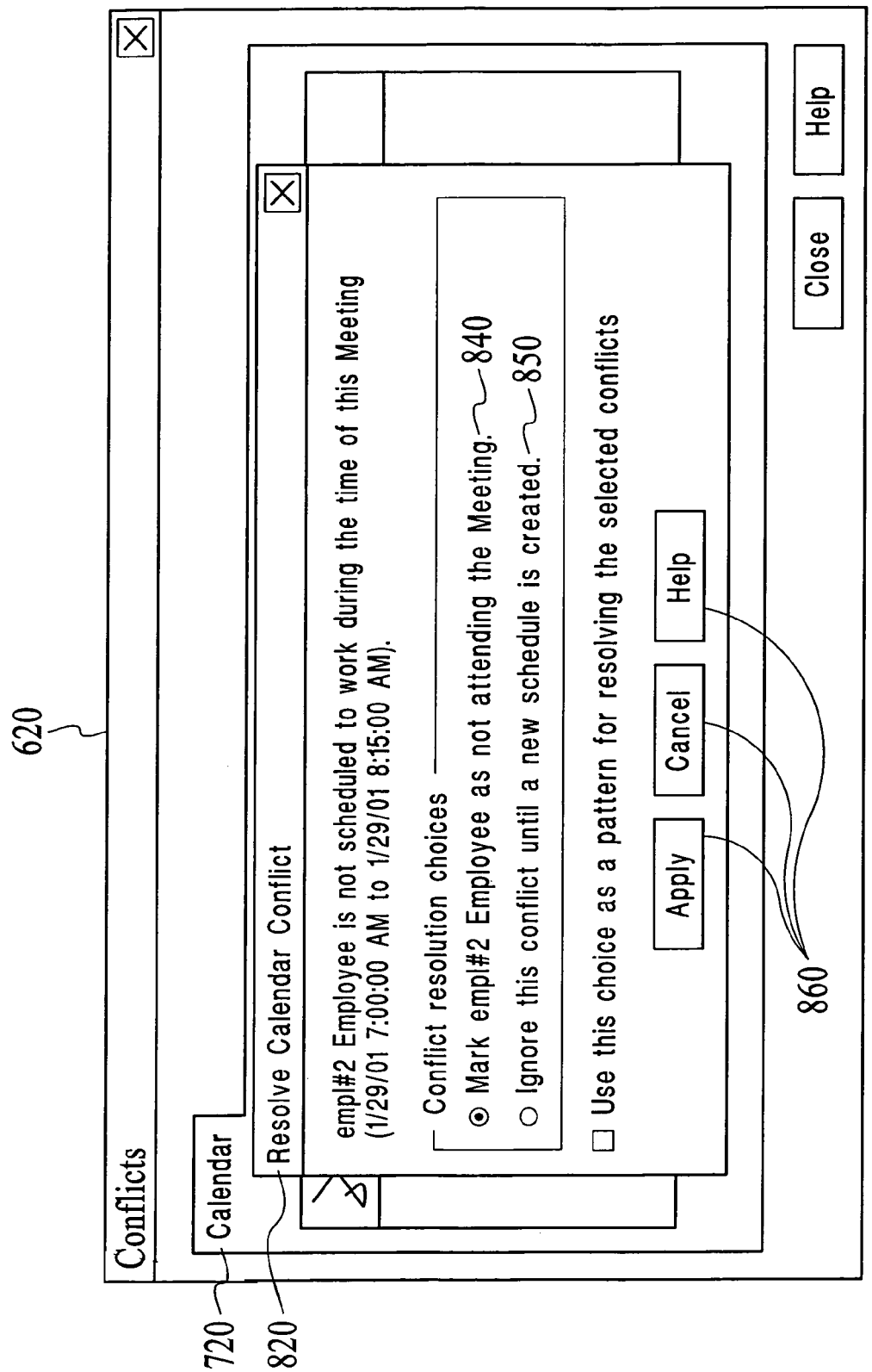
FIG. 8 is a depiction of an embodiment for real-time resource scheduling error identification showing a resolution window associated with a calendar conflict of a specific resource.

FIG. 8 depicts a Resolve Calendar Conflict page, 820, which gives the user an interactive means to correct the conflict. The conflict is repeated to the user, 830, and then, in this embodiment, two resolution choices are presented to the user, 840 and 850. In one embodiment, the user is presented with a solution that marks emlp#2 as not attending the meeting thus removing the calendar conflict, 840. The user may also ignore the conflict until a new schedule is created, 850. Having made a choice, the user than can apply the selection, cancel the resolution process, or seek additional help by using the three interactive "Apply, Cancel, and Help" buttons located at the bottom of the page, 860.

Figure 9:
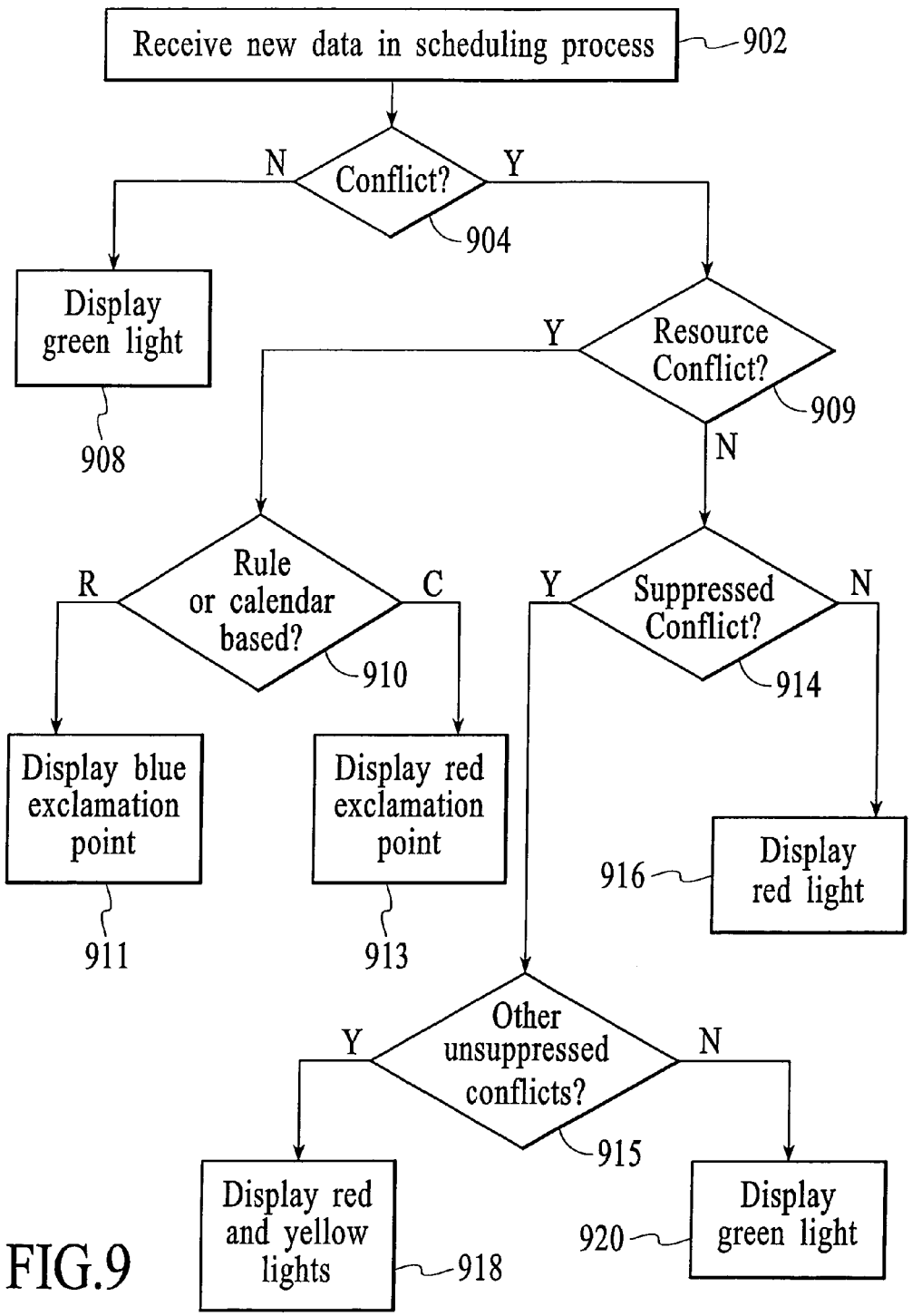
FIG. 9 is a flow diagram of concurrent real-time error identification according to an embodiment.

FIG. 9 is a flow diagram illustrating a process of concurrent real-time error identification according to an embodiment. The process begins at 902 when a user of a scheduling system enters new data. In one embodiment, an error identification method operates within and concurrent with the primary resource scheduling process and analyzes data for any conflicts. While error identification and notification of resource conflicts can operate independently of the primary resource scheduling process, in one embodiment error identification is a part of a primary resource scheduling process.

At 904, it is determined whether a conflict exists. If no conflict exists, a green light is displayed to the user at 908. If a conflict does exist, it is determined at 909 whether the conflict is resource specific, for example, whether the conflict relates to a particular employee. If the conflict is resource specific, it is determined at 910 whether the conflict is rule based or calendar based. If the conflict is rule based, a blue exclamation point is displayed at 911. If the conflict is calendar base, a red exclamation point is displayed at 913.

Referring again to block 909, if it is determined the conflict is not resource specific, it is then determined at 914 whether the conflict has been previously suppressed. If the conflict is suppressed, it is then determined at 915 whether there are other conflicts that are unsuppressed. If there are other conflicts that are unsuppressed, both a red and a yellow light are displayed at 918. If there are no unsuppressed conflicts, a green light is displayed at 920.

Referring again to 914, if the conflict is not suppressed, a red light is displayed at 916.

When a red, green or yellow light is displayed, the user can then click on the light for further information. If the user clicks on the red light, a new window containing an HTML page is generated describing the conflict and suggesting potential solutions. To do this, one embodiment utilizes a warning template file and the Windows registry.

If the user clicks on the yellow indication light, an HTML page is generated describing the suppressed conflict or conflicts and potential solutions. Contained within the new HTML page is a hyperlink that connects the user to the specific window within the primary scheduling resource software where the conflicted resource can be altered. If the user clicks on the hyperlink, one embodiment communicates with the primary resource scheduling software, causing the display of the specific window necessary to modify the data causing the error. Additionally, the data that should be altered is highlighted to facilitate resolving the conflict. If the user elects to suppress the conflict, the conflict is marked appropriately and stored in the Windows registry. If the user elects to un-suppress the conflict, an HTML page is generated based on the new unsuppressed conflict.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A computer implemented method for performing complex resource scheduling of many resources, the method comprising:

providing a real-time indication of resource scheduling conflicts during the computer-implemented method;

analyzing resource scheduling data including real-time detection of resource conflicts, wherein resource conflicts include rule based conflicts and calendar based conflicts;

generating an indication that a resource conflict exists concurrent with the computer-implemented method; and in response to a user input, automatically continuing with the scheduling method without resolving the conflict.

* * * * *